US009402097B2

(12) United States Patent
Kitahara et al.

(10) Patent No.: US 9,402,097 B2
(45) Date of Patent: Jul. 26, 2016

(54) INFORMATION PROCESSING APPARATUS, INFORMATION PROCESSING METHOD, AND PROGRAM

(71) Applicant: Sony Corporation, Tokyo (JP)

(72) Inventors: Jun Kitahara, Saitama (JP); Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/351,685

(22) PCT Filed: Oct. 29, 2012

(86) PCT No.: PCT/JP2012/006907
§ 371 (c)(1),
(2) Date: Apr. 14, 2014

(87) PCT Pub. No.: WO2013/065279
PCT Pub. Date: May 10, 2013

(65) Prior Publication Data
US 2014/0237529 A1 Aug. 21, 2014

(30) Foreign Application Priority Data
Nov. 2, 2011 (JP) .................................. 2011-241515

(51) Int. Cl.
*H04N 7/16* (2011.01)
*H04N 21/438* (2011.01)
(Continued)

(52) U.S. Cl.
CPC ............. *H04N 21/438* (2013.01); *H04H 60/13* (2013.01); *H04N 21/23617* (2013.01); *H04N 21/4345* (2013.01); *H04N 21/4353* (2013.01); *H04N 21/44222* (2013.01); *H04N 21/4823* (2013.01); *H04N 21/8166* (2013.01);
(Continued)

(58) Field of Classification Search
CPC .................................................. H04N 21/4345
See application file for complete search history.

(56) References Cited

U.S. PATENT DOCUMENTS 8,463,104 B2    6/2013  Iwakiri et al.
2008/0216108 A1* 9/2008  Beaunoir ........... H04N 21/4345
                                                      725/25

FOREIGN PATENT DOCUMENTS

JP          2011-155317 A      8/2011

OTHER PUBLICATIONS

Association of Radio Industries and Businesses, Digital Hoso ni Okeru Application Jikko Kankyo Hyojun Kikaku ARIB STD-B23, 1.2 edition, Jul. 29, 2009, pp. 56 to 57.

(Continued)

*Primary Examiner* — Olugbenga Idowu
(74) *Attorney, Agent, or Firm* — Chip Law Group

(57) ABSTRACT

[Object]
To provide an information processing apparatus capable of using an application seamlessly executable across channels of different broadcast stations.
[Solving Means]
Identification information "common" that is common to all business operators can be set as an organization ID for specifying a business operator providing an application. In addition, when the common identification information "common" is set as an organization ID of an acquired XML-AIT, an application controller (508) does not judge that an activation of an application corresponding to the XML-AIT is unpermitted based on the organization ID. Accordingly, it becomes possible to use an application seamlessly executable across channels of different broadcast stations, such as an application for a rating survey.

7 Claims, 14 Drawing Sheets

(51) Int. Cl.
*H04N 21/236* (2011.01)
*H04N 21/434* (2011.01)
*H04N 21/442* (2011.01)
*H04N 21/482* (2011.01)
*H04N 21/8355* (2011.01)
*H04N 21/8545* (2011.01)
*H04N 21/435* (2011.01)
*H04H 60/13* (2008.01)
*H04N 21/81* (2011.01)
*H04N 21/8352* (2011.01)
*H04N 21/858* (2011.01)

(52) U.S. Cl.
CPC ...... *H04N 21/8173* (2013.01); *H04N 21/8352* (2013.01); *H04N 21/83555* (2013.01); *H04N 21/8545* (2013.01); *H04N 21/8586* (2013.01)

(56) References Cited

OTHER PUBLICATIONS

ETSI, European Telecommunications Standards Institute Technical Specification 102 796, V1.1.1, Jun. 2010, p. 29.
ETSI, European Telecommunications Standards Institute Technical Specification 102 809, V1.1.1, Jan. 2010, pp. 15-16.
ETSI (European Telecommunications Standards Institute) "ETSI TS 102 796 V1.1.1 (Jun. 2010)" http://www.etsi.org/deliver/etsi_ts/102700_102799/102796/01.01.01_60/ts_102796v010101p.pdf (browsed on Oct. 21, 2011).
Association of Radio Industries and Businesses "Application execution environment standard ARIB STD-B23 1.2 in digital broadcast" http://www.arib.or.jp/english/html/overview/doc/2-STD-B23v1_2.pdf (browsed on Oct. 21, 2011).
International Search Report from International Application No. PCT/JP2012/006907, dated Dec. 18, 2012.

\* cited by examiner

| | No. of bits | Identifier |
|---|---|---|
| application_information_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   test_application_flag | 1 | bslbf |
|   application_type | 15 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   common_descriptors_length | 12 | uimsbf |
|   for(i=0;i<N;i++){ | | |
|     descriptor() | | |
|   } | | |
|   reserved_future_use | 4 | bslbf |
|   application_loop_length | 12 | uimsbf |
|   for(i=0;i<N;i++){ | | |
|     application_identifier() | | |
|     application_control_code | 8 | uimsbf |
|     reserved_future_use | 4 | bslbf |
|     application_descriptors_loop_length | 12 | uimsbf |
|     for(j=0;j<N;j++){ | | |
|       descriptor() | | |
|     } | | |
|   } | | |
|   CRC_32 | 32 | rpchof |
| } | | |

FIG.2

| Field | | Description |
|---|---|---|
| appName | | Application name |
| applicationIdentifier | | ID for uniquely specifying application |
| applicationDescriptor | | Versatile descriptor common to application |
| | type | Designation of application type |
| | controlCode | Designation of value of application_control_code |
| | visibility | Designation of application visibility |
| | serviceBound | Flag indicating whether application is effective only in current service |
| | priority | Application priority |
| | version | Application version |
| | mhpVersion | Version according to platform profile |
| | icon | Designation of icon |
| | storageCapability | Storage function performance |
| applicationTransport | | Transport protocol descriptor |
| applicationLocation | | Application location descriptor |
| applicationBoundary | | Application boundary descriptor |
| applicationSpecificDescriptor | | Application specific descriptor |
| applicationUsageDescriptor | | Application usage descriptor |

FIG.3

| MPEG-2 encoding | Identifier | Semantics |
|---|---|---|
| 0x00 | | reserved_future_use |
| 0x01 | AUTOSTART | The application shall be started when the service is selected, unless the application is already running. |
| 0x02 | PRESENT | The application is allowed to run while the service is selected, however it shall not start automatically when the service becomes selected. |
| 0x03 | DESTROY | The application shall be stopped but may be permitted the opportunity to close down gracefully. Attempts to start the application shall fail. |
| 0x04 | KILL | The application shall be stopped as soon as possible. Attempts to start the application shall fail. |
| 0x05 | PREFETCH | Application files should be cached by the receiver, if possible. The application shall not be started and attempts to start it shall fail. |
| 0x06 | REMOTE | This identifies an application that is not available on the current transport stream and hence only available after tuning to a new transport stream or if cached and signalled as launchable completely from cache. |
| 0x07 | DISABLED | The application shall not be started and attempts to start it shall fail. |
| 0x08 | PLAYBACK_AUTOSTART | The application shall not be run, neither direct from broadcast nor when in timeshift mode. When a recording is being played back from storage, the application shall be presented as if it was autostart. |
| 0x09 to 0xFF | | reserved_future_use |

FIG.4

| | No. of bits |
|---|---|
| application_identifier{ | |
| organisation_id | 32 |
| application_id | 16 |
| } | |

| Field | | | Description |
|---|---|---|---|
| SignatureID | | | XML signature element |
| SignatureInfo | | | Signature information |
| | CanonicalizationMethod | | XML normalization algorithm |
| | SignatureMethod | | Signature algorithm |
| | Reference | | |
| | | Transform | Normalization transformation process |
| | | DigestMethod | Digest calculation algorithm |
| | | DigestValue | Digest value |
| SignatureValue | | | Signature value |
| keyInfo | | | Key information |
| | keyValue | | Validation key |
| | X.509Data | | X.509 certification |
| ObjectID | | | XML signature target element |

FIG.12

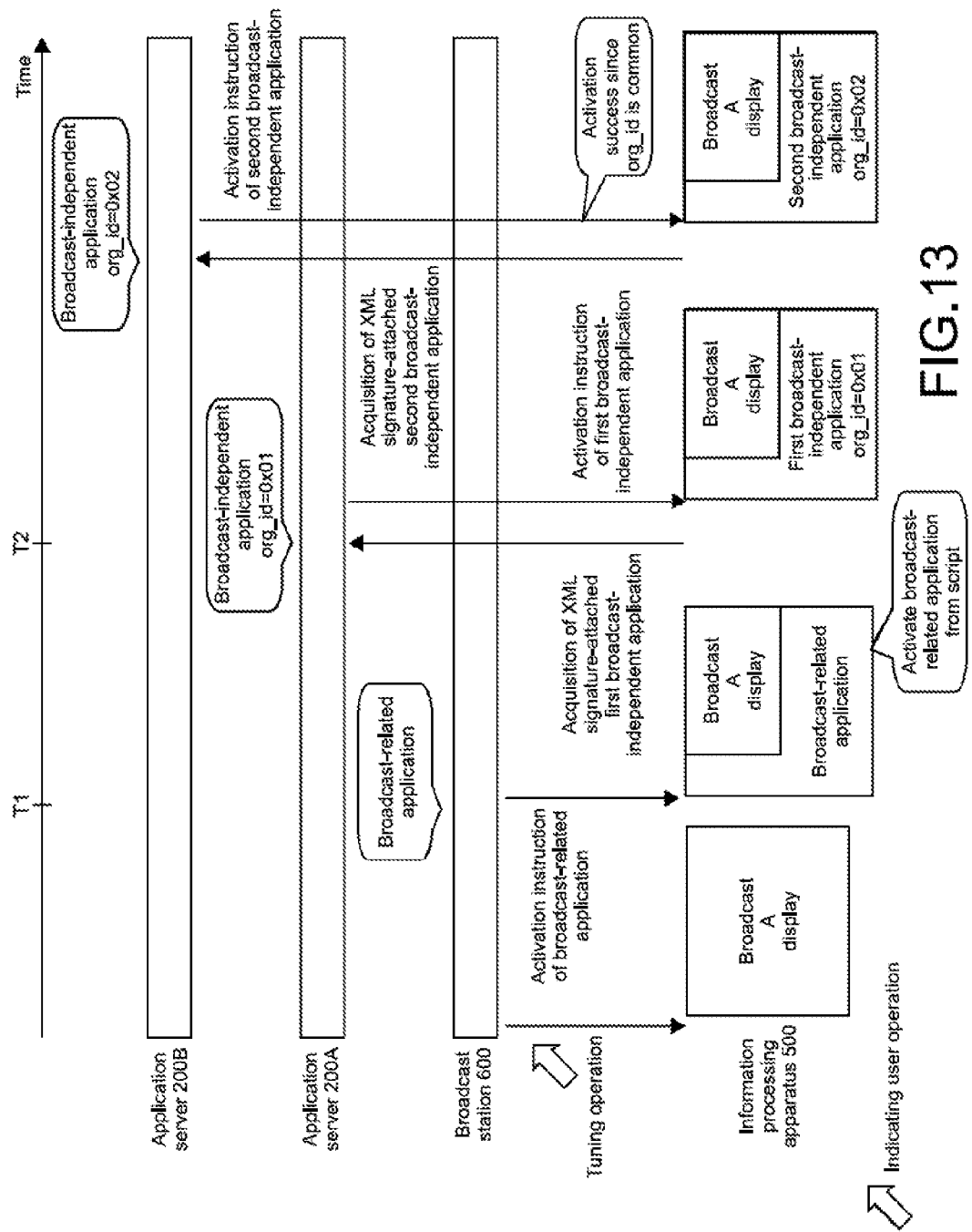

INFORMATION PROCESSING APPARATUS, INFORMATION PROCESSING METHOD, AND PROGRAM

CROSS-REFERENCE TO RELATED APPLICATION

The present application is a national phase entry under 35 U.S.C. §371 of International Application No. PCT/JP2012/006907 filed Oct. 29, 2012, published on Oct. 5, 2013 as WO 2013/065279 A1, which claims priority from Japanese Patent Application No. JP 2011-241515 filed in the Japanese Patent Office on Nov. 2, 2011.

TECHNICAL FIELD

The present disclosure relates to an information processing apparatus, an information processing method, and a program with which an application related to a broadcast content can be executed using an application management table.

BACKGROUND ART

In recent years, a technique that enables an application delivered via a network such as the Internet to be executed simultaneous with a reproduction of a broadcast content has been known. As such a technique, a technique called hybrid broadcast broadband TV (hereinafter, referred to as "HbbTV") is known. As a standard of HbbTV, "ETSI TS 102 796" (see Non-patent Literature 1) has been developed in Europe. Further, the standard "ARIB STD-B23" (see Non-patent Literature 2) conforming thereto has been developed also in our country.

CITATION LIST

Non Patent Literature

[Non Patent Literature 1]
ETSI (European Telecommunications Standards Institute) "ETSI TS 102 796 V1.1.1 (2010-06)"
http://www.etsi.org/deliver/etsi_ts/102700_102799/102796/01.01.01_60/ts_102796 v010101p.pdf (browsed on Oct. 21, 2011)
[Non Patent Literature 2]
Association of Radio Industries and Businesses "Application execution environment standard ARIB STD-B23 1.2 in digital broadcast" http://www.arib.or.jp/english/html/overview/doc/2-STD-B23v1_2.pdf (browsed on Oct. 21, 2011)

SUMMARY

Technical Problem

For example, in a system in which an application is executed simultaneously with a reproduction of a broadcast content as in HbbTV, a life cycle of an application from an activation to an end is managed by a data structure called AIT (Application Information Table) superimposed on a broadcast content. An information terminal that has acquired the AIT controls the application based on an application control code included in the AIT.

In addition to the application control code, the AIT also includes an organization ID (organization_id) that indicates an organization (business operator) providing an application and an application ID (application_id) for identifying an application. In the AIT of an application executed in link with a broadcast content provided from a certain broadcast station, an organization ID of that broadcast station is set. Further, as an application provided from the same broadcast station, there is also a broadcast-independent application that is provided from a server via the Internet. Such a broadcast-independent application can be activated by, for example, executing a script included in a broadcast-related application. At this time, only when the organization ID of the broadcast-related application already being executed matches with that of the broadcast-independent application, the broadcast-independent application can be activated. This is for avoiding presentment of a broadcast-independent application provided from a broadcast station different from that providing the broadcast content being reproduced.

However, such a limitation has the following demerit. For example, an application that can be commonly used by a plurality of broadcast stations for the purpose of a rating survey or the like will be discussed. It is desirable for such an application to be executable seamlessly across channels of different broadcast stations. However, such an application cannot be used under a standard that inhibits transitions among applications having different organization IDs.

In view of the circumstances as described above, an object of the present disclosure is to provide an information processing apparatus, an information processing method, and a program that are capable of using an application seamlessly executable across channels of different broadcast stations.

Solution to Problem

To solve the problem described above, according to the present disclosure, there is provided an information processing apparatus including: a broadcast content processing unit that receives and processes a broadcast content; and a controller that acquires an application related to the broadcast content and an application information table capable of setting identification information common to a plurality of business operators as a value of business operator identification information for specifying a business operator that provides the application, and removes, when the common identification information is set as the value of the business operator identification information in the application information table, the application from a target judged as unpermitted to be activated based on the business operator identification information.

The information processing apparatus may further include a validation unit that acquires and validates an electronic signature obligated to be attached to the application information table and notifies the controller of the validation result, and in that the controller may permit, when notified by the validation unit that the validation has succeeded, an activation of the application removed from the target judged as unpermitted to be activated based on the business operator identification information.

In the information processing apparatus, the application is a broadcast-independent application that is independent from the broadcast content.

In the information processing apparatus, the controller may acquire, from a server apparatus via a network, the application information table related to the application, and acquire the application based on information described in the application information table.

According to the present disclosure, there is provided an information processing method including: receiving and processing a broadcast content; acquiring, by a controller, an application related to the broadcast content and an application information table capable of setting identification information common to a plurality of business operators as a value of business operator identification information for specifying a business operator that provides the application; and removing, by the controller, when the common identification information is set as the value of the business operator identification information in the application information table, the application from a target judged as unpermitted to be activated based on the business operator identification information.

According to the present disclosure, there is provided a program that causes a computer to function as a controller that acquires an application information table capable of setting identification information common to a plurality of business operators as a value of business operator identification information for specifying a business operator that provides an application related to a broadcast content, and removes, when the common identification information is set as the value of the business operator identification information in the application information table, the application from a target judged as unpermitted to be activated based on the business operator identification information.

Effect of Invention

As described above, according to the present disclosure, an application seamlessly executable across channels of different broadcast stations can be used.

BRIEF DESCRIPTION OF DRAWINGS

FIG. 2
A diagram showing an AIT data structure.
FIG. 3
A diagram showing an XML-AIT data structure.
FIG. 4
A diagram showing definitions of application control codes.
FIG. 5
A diagram showing a data structure of an application identifier.
FIG. 12
A diagram showing a data structure of an XML signature.
FIG. 13
A diagram showing a transition operation of a broadcast-independent application in the information processing system shown in FIG. 1.

DESCRIPTION OF EMBODIMENTS

Figure 1:
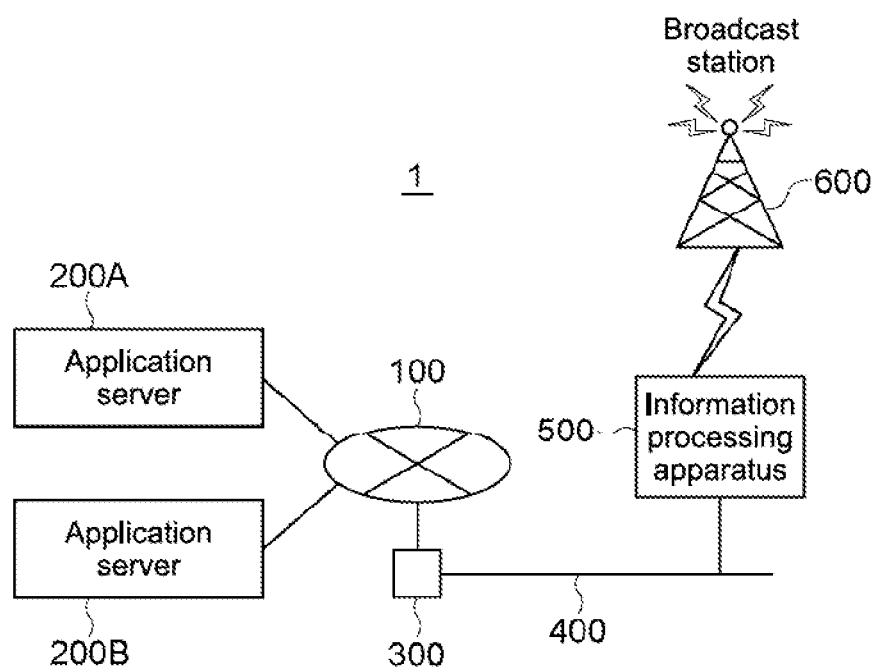
FIG. 1
A diagram showing a general outline of an information processing system of this embodiment.

Hereinafter, an embodiment of the present disclosure will be described with reference to the drawings.
[Information Processing System]
FIG. 1 is a diagram showing a general outline of an information processing system of this embodiment.

The information processing system 1 of this embodiment includes a first network 100 such as the Internet, a plurality of application servers 200A and 200B, an edge router 300, a second network 400 such as a LAN (Local Area Network), an information processing apparatus 500, and a broadcast station 600.

The broadcast station 600 transmits digital broadcast signals via a communication medium such as terrestrial, satellite, and IP (Internet Protocol) networks. The broadcast station 600 is capable of multiplexing and transmitting a stream packet of a broadcast content, a packet of an application to be executed simultaneous with a reproduction of the broadcast content, and a PSI/SI (Program Specific Information/Service Information) packet including various types of information related to the broadcast content currently being broadcasted and the application.

The PSI/SI includes an application information table (hereinafter, referred to as "AIT") and the like as a data structure constituted of information for managing the application.

The plurality of application servers 200A and 200B are connectable to the first network 100 and capable of delivering, to the information processing apparatus 500 via the first network 100, an XML (Extensible Markup Language)-AIT describing a data structure constituted of a file of an application to be executed in relation to a reproduction of a broadcast content and information for managing the application.

It should be noted that a business operator of the application server 200A as one of the plurality of application servers 200A and 200B shown in FIG. 1 is the same as that of the broadcast station 600. A business operator of the application server 200B differs from that of the broadcast station 600. Hereinafter, the application servers 200A and 200B may be referred to as "application server 200" without distinguishing one from the other.

The edge router 300 is a router for connecting the first network 100 and the second network 400. The second network 400 may either be in a wired or wireless manner.

The information processing apparatus 500 is, for example, a personal computer, a cellular phone, a smartphone, a television apparatus, or a game device, though a product form thereof is not specifically limited.

The information processing apparatus 500 is capable of receiving and demodulating a digital broadcast signal from the broadcast station 600 to acquire a transport stream. The information processing apparatus 500 is capable of separating a broadcast content from the transport stream, decoding it, and outputting it to a display unit (not shown) or speaker unit (not shown) connected to the information processing apparatus 500 or a recording apparatus.

It should be noted that the display unit, the speaker unit, and the recording apparatus may be integrated with the information processing apparatus 500, or they may be directly connected to the information processing apparatus 500 or indirectly connected via the second network 400 as independent apparatuses. Alternatively, an apparatus (not shown) including the display unit and the speaker unit may be directly connected to the information processing apparatus 500 or indirectly connected via the second network 400.

The information processing apparatus 500 is also capable of extracting an application or PSI/SI including an AIT from the acquired transport stream and interpreting the AIT to thus control the application. When the application is a visible application, the information processing apparatus 500 can synthesize a video signal generated by executing the application with a video signal and subtitle signal of the broadcast content and output them to the display unit.

The information processing apparatus 500 is also capable of acquiring, from the application server 200 via the first network 100, the edge router 300, and the second network 400, the application and the XML-AIT file by download. The information processing apparatus 500 is capable of interpreting the acquired XML-AIT and controlling the application acquired from the application server 200.

[Application Type]

Here, application types will be described. As the application, there are a broadcast-related application and a broadcast-independent application.

The broadcast-related application is an application that is executed simultaneously with a reproduction of a broadcast content. In other words, the broadcast-related application is a bidirectional application that is controlled based on the AIT such that a lifecycle thereof from an activation to an end is in link with a broadcast content.

The broadcast-independent application is a bidirectional application that is executed in relation to a reproduction of a content and whose life cycle is controlled independently from a broadcast content by an AIT delivered by broadcast or an XML-AIT delivered by communication.

Both of the applications can be activated or ended based on an instruction of a user of the information processing apparatus 500 viewing a broadcast content. Moreover, for securing a relativity with a broadcast content, the broadcast-related application becomes executable while a related broadcast content is being received and is forcibly ended when a switch to a reception state of another broadcast content is made by a channel switch operation or the like.

[Application Activation]

There are the following application activation methods, for example.

1. A method of automatically activating an application based on an application control code "AUTOSTART" of an AIT and XML-AIT.

2. A method in which the information processing apparatus 500 creates and displays, with a predetermined remote controller operation as a trigger, an icon or list of currently-usable applications based on an AIT and prompts the user to select an application to be activated therefrom.

3. A method of activating a different application using a script incorporated into an application.

[Data Structures of AIT and XML-AIT]

Here, a data structure of an AIT provided from the broadcast station 600 and a data structure of an XML-AIT provided from the application server 200 will be described. It should be noted that when simply referred to as "AIT" in the specification, the term refers to the AIT provided from the broadcast station 600.

FIG. 2 is a diagram showing the AIT data structure.

The AIT 10 is a table that stores various types of information related to broadcast-related applications and broadcast-independent applications, application control codes for controlling the broadcast-related applications, and the like. Specifically, the AIT 10 stores a table ID, a section syntax instruction, a section length, an application format, a version number, a current next instruction, a section number, a final section number, a common descriptor loop length, an application information loop length, an application identifier 11, an application control code 12, an application information descriptor loop length, a descriptor 13, and the like.

FIG. 3 is a diagram showing the XML-AIT data structure.

The XML-AIT 20 is a table that stores various types of information related to broadcast-independent applications, application control codes for controlling the broadcast-independent applications, and the like. Specifically, the XML-AIT 20 stores an application name, an application identifier 21, an application descriptor, an application type, an application control code 22, an application visibility, a flag indicating whether an application is effective in only the current service, an application priority 24, an application version, a version according to platform profile, an icon, storage function performance, a transport protocol descriptor 25, an application location descriptor 23, an application boundary descriptor, an application specific descriptor, an application usage descriptor, and the like.

[Definitions of Application Control Codes]

A life cycle of an application is dynamically controlled by the information processing apparatus 500 based on the application control codes 12 and 22 respectively stored in the AIT 10 and the XML-AIT 20.

FIG. 4 is a diagram showing definitions of the application control codes 12 and 22 respectively stored in the AIT 10 and the XML-AIT 20.

As shown in the figure, as the application control codes, there are "AUTOSTART", "PRESENT", "DESTROY", "KILL", "PREFETCH", "REMOTE", "DISABLED", and "PLAYBACK_AUTOSTART" as the standard.

"AUTOSTART" is a code that instructs to automatically activate an application along with a service selection, provided that the application is not yet executed. "PRESENT" is a code that instructs to set an application to an executable state while the service is being selected. It should be noted that a target application is not automatically activated along with the service selection and is activated upon reception of an activation instruction from the user.

"DESTROY" is a code that instructs to permit an end of an application.

"KILL" is a code that instructs to forcibly end an application.

"PREFETCH" is a code that instructs to cache an application.

"REMOTE" is a code indicating that an application is an application that cannot be acquired in a current transport stream. Such an application becomes usable when acquired from another transport stream or a cache.

"DISABLED" is a code indicating that an application activation is prohibited.

"PLAYBACK_AUTOSTART" is a code for activating an application along with a reproduction of a broadcast content recoded onto a storage (recording apparatus).

[Data structure of Application Identifier]

An application is uniquely identified by the application identifiers 11 and 21 respectively stored in the AIT 10 and the XML-AIT 20.

FIG. 5 is a diagram showing a data structure of an application identifier.

The application identifier is constituted of an organization ID (organization_id) and an application ID (application_id). In other words, an application is uniquely identified by a combination of the organization ID and the application ID.

The organization ID is information for uniquely identifying an organization (business operator) providing an application.

The application ID is information for uniquely identifying an application in the organization ID.

[Operation Example Common to Typical Information Processing System and Information Processing System 1 of This Embodiment]

Next, an operation example common to a typical information processing system and the information processing system 1 of this embodiment will be described.

(1. Typical Operation Example 1 Regarding Transition Between Broadcast-Related Applications)

Figure 6:
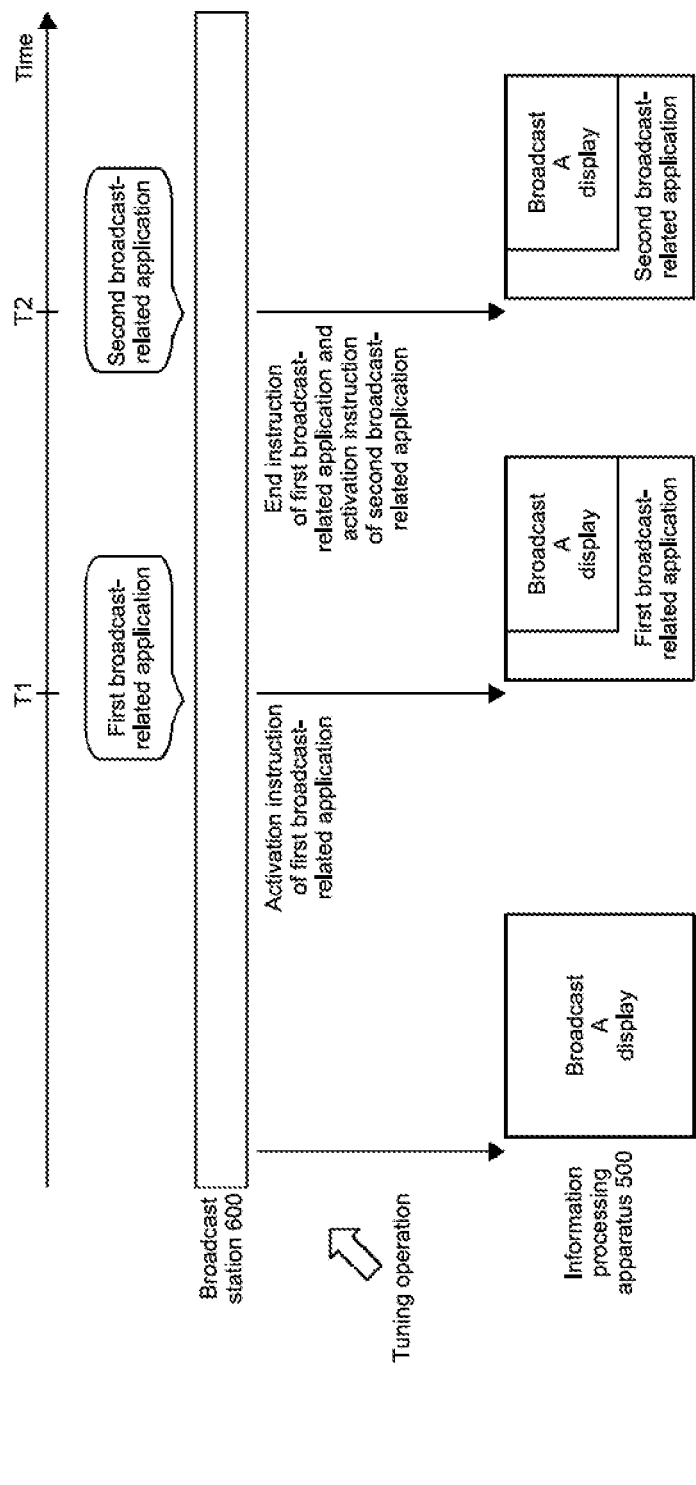
FIG. 6
A diagram showing a typical operation example 1 regarding a transition between broadcast-related applications in the information processing system shown in FIG. 1.

FIG. 6 is a diagram showing a typical operation example 1 regarding a transition between broadcast-related applications in the information processing apparatus 500 of the information processing system 1 shown in FIG. 1. The operation example 1 is a typical operation example of a case where a switch is made between two broadcast-related applications acquired from the broadcast station 600 through broadcast waves to thus be executed.

The information processing apparatus 500 receives a broadcast content (broadcast A) from the broadcast station 600 selected by the user using a remote controller, for example, carries out decoding processing on video data, audio data, subtitle data, and the like, and outputs the broadcast content (broadcast A) to the display unit and speaker unit connected to the information processing apparatus 500.

In this example, a broadcast-related application (hereinafter, referred to as "first broadcast-related application") and an AIT related to the first broadcast-related application are superimposed on the broadcast content and broadcasted from the broadcast station 600 at a time T1.

The AIT stores the application control code "AUTOSTART" that instructs to activate the first broadcast-related application. Upon receiving the first broadcast-related application and the AIT, the information processing apparatus 500 activates the first broadcast-related application based on the application control code "AUTOSTART" described in the AIT. The activated first broadcast-related application is visualized as a window superimposed on a video of the broadcast content A displayed on the display unit, for example.

Subsequently, at a time T2, a new AIT including an application control code "DESTROY" or "KILL" that instructs to end the first broadcast-related application and an application control code "AUTOSTART" that instructs to activate another broadcast-related application (hereinafter, referred to as "second broadcast-related application") is superimposed on the broadcast content and broadcasted from the broadcast station 600.

Upon receiving the new AIT, the information processing apparatus 500 ends the first broadcast-related application based on the application control code "DESTROY" or "KILL" described in the new AIT and activates the second broadcast-related application according to the application control code "AUTOSTART" described in the AIT. Accordingly, the second broadcast-related application is visualized on the display unit of the information processing apparatus 500 in place of the first broadcast-related application.

(2. Typical Operation Example 2 Regarding Transition Between Broadcast-Related Applications)

Figure 7:
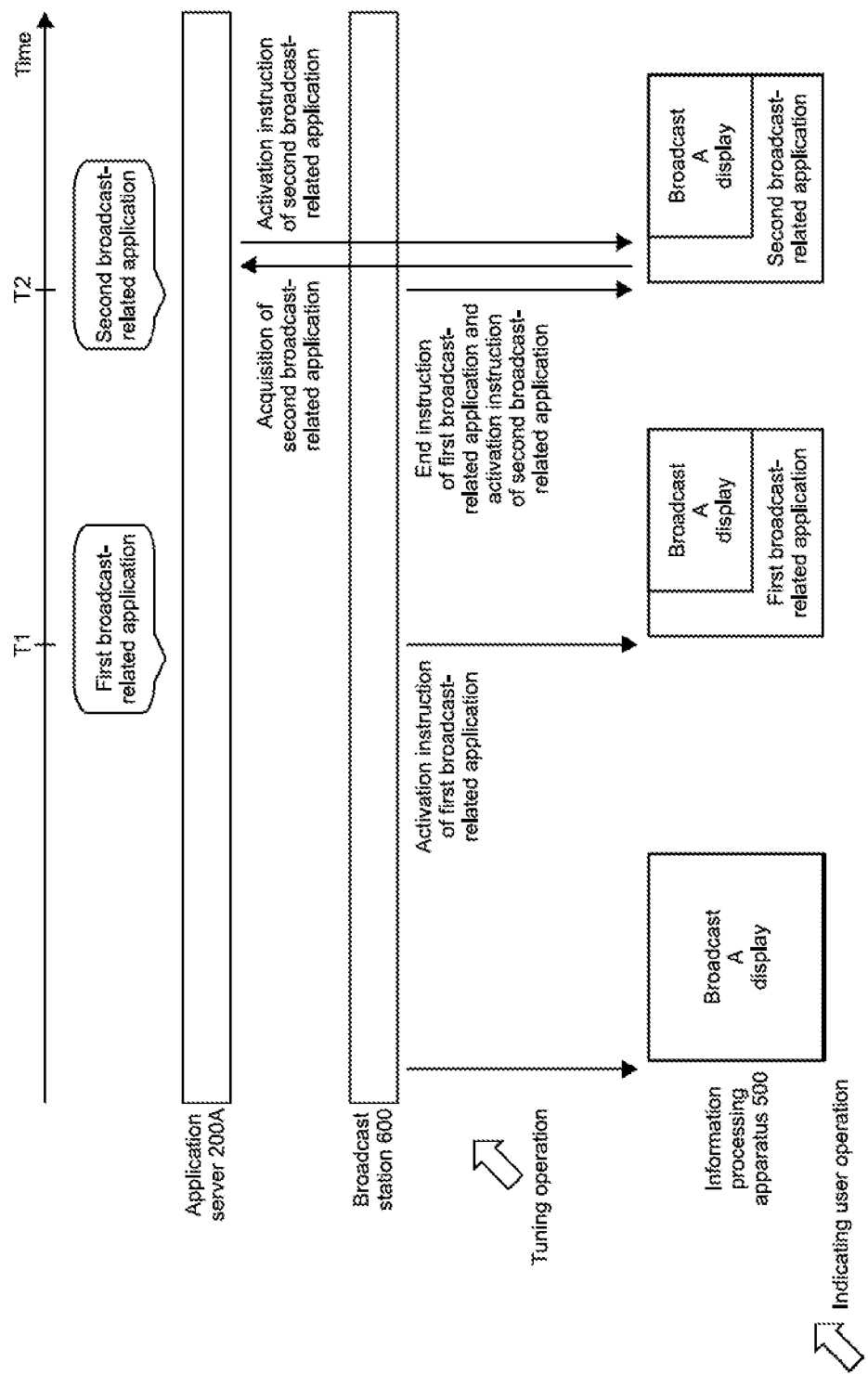
FIG. 7
A diagram showing a typical operation example 2 regarding a transition between broadcast-related applications in the information processing system shown in FIG. 1.

FIG. 7 is a diagram showing a typical operation example 2 regarding a transition between broadcast-related applications in the information processing apparatus 500 of the information processing system 1 shown in FIG. 1. The operation example 2 is a typical operation example of a case where a broadcast-related application acquired from the broadcast station 600 through broadcast waves is switched to a broadcast-related application acquired from the application server 200A to be executed.

In the typical operation example 2, for acquiring the second broadcast-related application from the application server 200A, information on a communication protocol for acquiring the second broadcast-related application, location information such as a URI of a file of the second broadcast-related application, and the like are described in the descriptor( ) 13 (FIG. 2) of the AIT.

In the typical operation example 2, at a time T2, a new AIT including an application control code "DESTROY" or "KILL" that instructs to end the first broadcast-related application and an application control code "AUTOSTART" that instructs to activate another broadcast-related application (hereinafter, referred to as "second broadcast-related application") is superimposed on a broadcast content and broadcasted from the broadcast station 600.

Upon receiving the new AIT, the information processing apparatus 500 accesses the application server 200A and acquires the second broadcast-related application based on information described in the descriptor( )13 (FIG. 2) related to the second broadcast-related application in the AIT.

Subsequently, the information processing apparatus 500 ends the first broadcast-related application based on the application control code "DESTROY" or "KILL" with respect to the first broadcast-related application in the AIT. Further, the information processing apparatus 500 activates the second broadcast-related application according to the application control code "AUTOSTART" with respect to the second broadcast-related application in the AIT. Accordingly, the second broadcast-related application is visualized on the display unit of the information processing apparatus 500 in place of the first broadcast-related application.

(3. Typical Operation Example Regarding Execution Of Broadcast-Independent Application)

Figure 8:
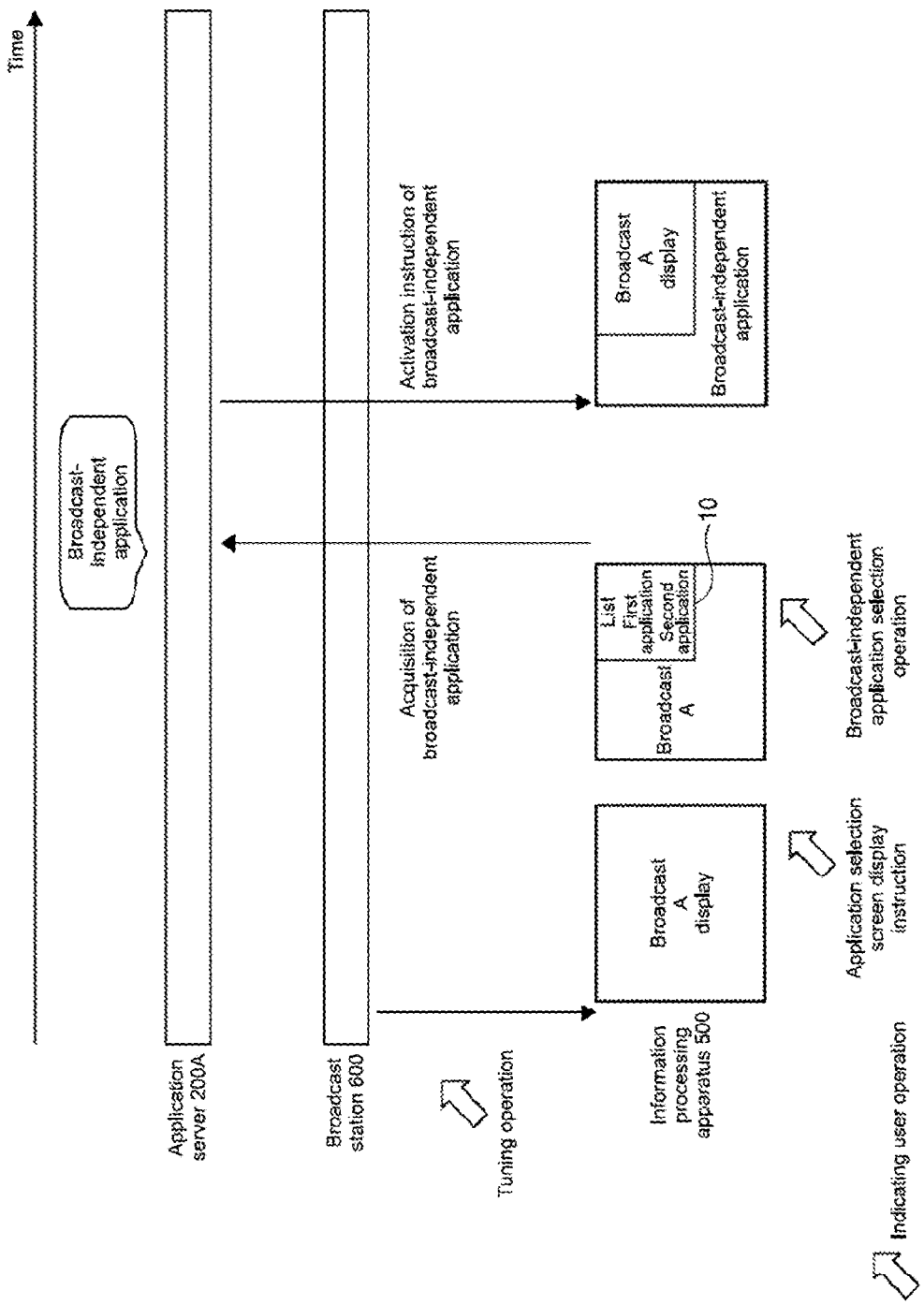
FIG. 8
A diagram showing a typical operation example 3 regarding an execution of a broadcast-independent application in an information processing apparatus of the information processing system shown in FIG. 1.

FIG. 8 is a diagram showing a typical operation example 3 regarding an execution of a broadcast-independent application in the information processing apparatus 500 of the information processing system 1 shown in FIG. 1.

In the typical operation example 3, information requisite for accessing an XML-AIT corresponding to one or more broadcast-independent applications that are currently usable in relation to a broadcast content A is superimposed on the broadcast content A and broadcasted. Based on the information, the information processing apparatus 500 generates an icon or list of the one or more currently-usable broadcast-independent applications, displays it on the display unit, acquires an XML-AIT of the broadcast-independent application selected by the user, and activates the broadcast-independent application.

More specifically, when an application selection screen display instruction is input by the user through an operation using a remote controller or the like while the broadcast content A is being reproduced (display screen a), the information processing apparatus 500 generates an application selection screen 10 including an icon or list of the one or more currently-usable broadcast-independent applications and displays it on the display unit. The application selection screen 10 is visualized as a window superimposed on a video of the broadcast content A displayed on the display unit. Information on a communication protocol requisite for accessing an XML-AIT for a relevant broadcast-independent application, location information of the XML-AIT, and the like are associated with the icon or list displayed on the application selection screen 10. Based on the information associated with the icon or list selected by the user from the icons or list displayed on the application selection screen 10, the information processing apparatus 500 acquires an XML-AIT of the selected broadcast-independent application.

The information processing apparatus 500 extracts, for example, information on a communication protocol and location information of the broadcast-independent application, that are requisite for acquiring the broadcast-independent application from the XML-AIT, and acquires the broadcast-independent application from the application server 200A based on those information. The information processing apparatus 500 activates the broadcast-independent application based on the application control code "AUTOSTART" described in the XML-AIT. The activated broadcast-independent application is visualized as a window 10 superimposed on a video of the broadcast content A displayed on the display unit, for example.

(4. Typical Operation Example 4 Including Transition From Broadcast-Related Application to Broadcast-Independent Application)

Figure 9:
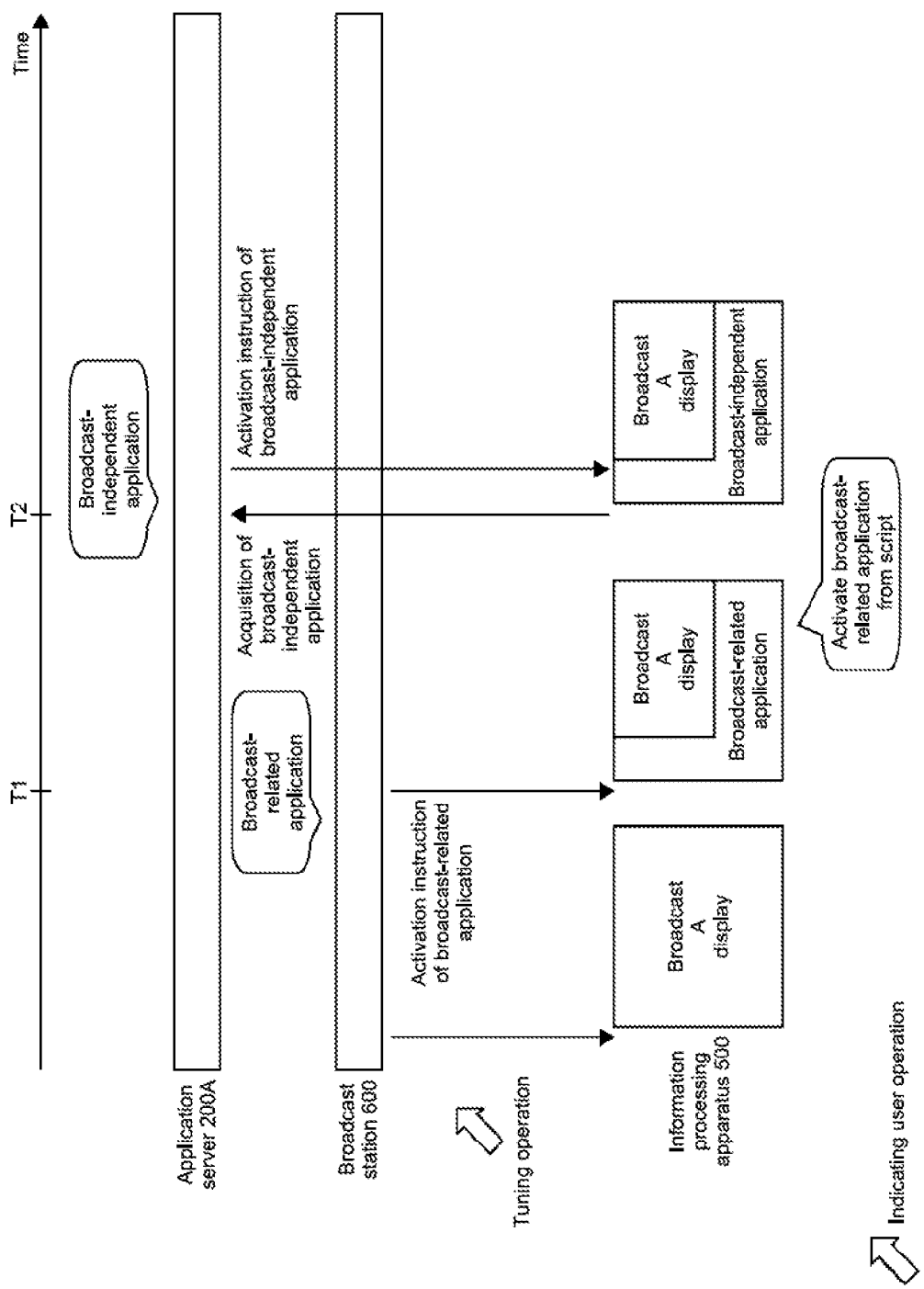
FIG. 9
A diagram showing a typical operation example 4 regarding a transition from a broadcast-related application to a broadcast-independent application in the information processing system shown in FIG. 1.

FIG. 9 is a diagram showing a typical operation example 4 regarding a transition from a broadcast-related application to a broadcast-independent application in the information processing apparatus 500 of the information processing system 1 shown in FIG. 1.

In the typical operation example 4, a case where a script including a createApplication( ) function for activating a broadcast-independent application is incorporated into a broadcast-related application is assumed. As an argument in the createApplication( ) function, information on a communication protocol requisite for accessing an XML-AIT for a broadcast-independent application, location information of the XML-AIT, and the like are set. In the typical operation example 4, a broadcast-independent application provided from the application server 200A belonging to the same organization as the broadcast station 600 is assumed. Therefore, the location information of the XML-AIT is a URL (Uniform Resource Locator) belonging to the application server 200A. The communication protocol is HTTP (Hypertext Transfer Protocol).

By executing the script as a predetermined condition on a time or the like is established while a broadcast-related application is being executed, the information processing apparatus 500 acquires an XML-AIT for a broadcast-independent application from the application server 200A. After that, the information processing apparatus 500 acquires and activates the broadcast-independent application based on the XML-AIT as in the typical operation example 3 described above.

Incidentally, in the HbbTV standard, to enable an application to be activated from another application already being executed for avoiding presentment of a broadcast-independent application provided by a business operator not belonging to the same organization as a broadcast station providing a broadcast content being reproduced, organization IDs of the applications need to be the same. Since the typical operation examples 1 to 4 described heretofore assume that the application to be activated is a broadcast-related application provided from the broadcast station 600 through broadcast waves or a broadcast-related application provided from the application server 200A belonging to the same organization as the broadcast station 600, the organization IDs of the applications are all the same, thus satisfying the condition for permitting an activation of the application.

However, such a limitation has the following demerit. For example, regarding an application assumed to be commonly used by a plurality of broadcast stations, such as an application for a rating survey, it is desirable for such an application to be executable seamlessly across channels of different broadcast stations. However, such an application is limited in the activation based on the organization ID according to the HbbTV standard.

Figure 10:
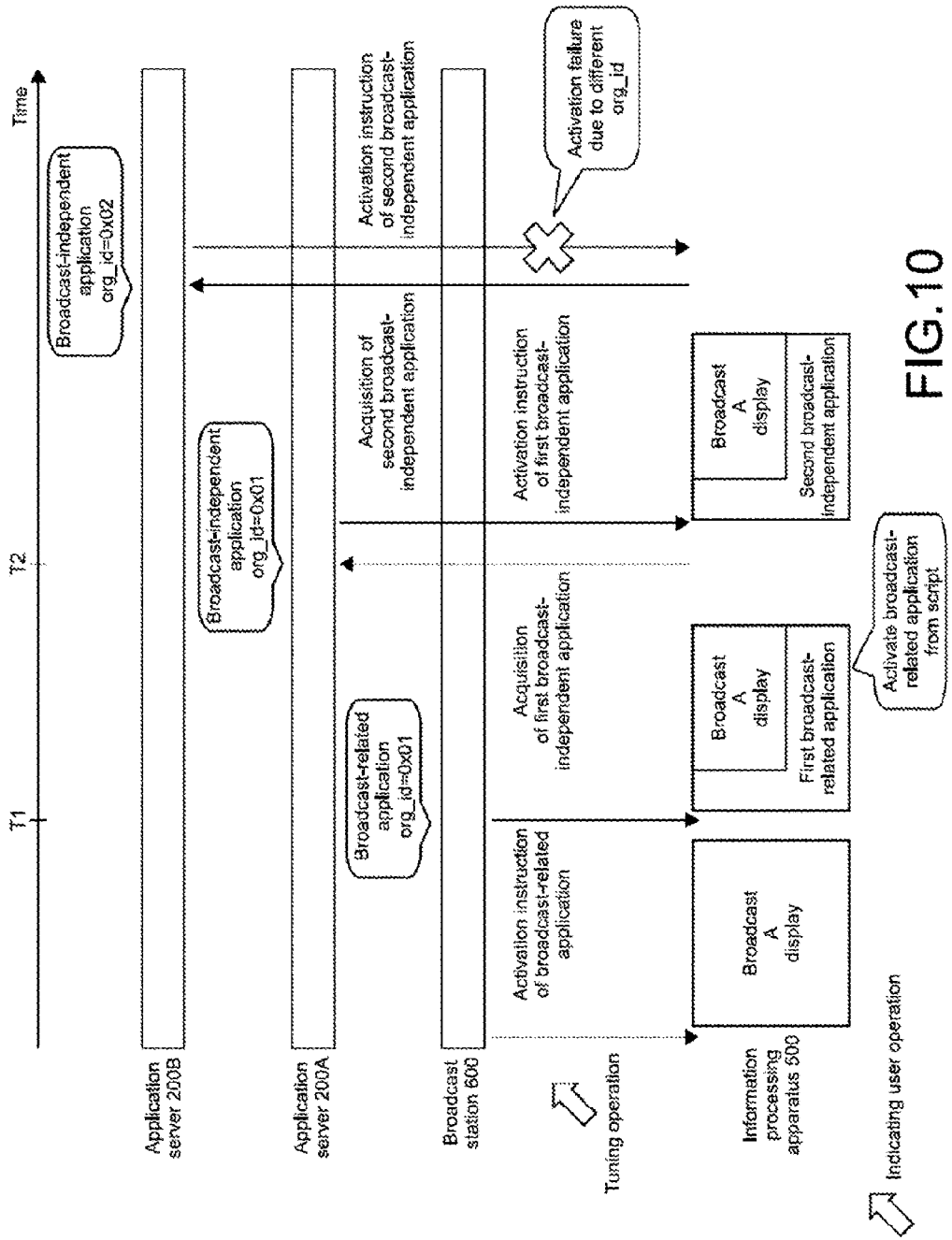
FIG. 10
A diagram showing an operation example where a transition between broadcast-independent applications fails in the information processing system conforming to the standard.

FIG. 10 is a conceptual diagram showing a case where an activation from a broadcast-independent application acquired from the application server in the information processing system conforming to the standard (e.g., application server 200A shown in FIG. 1) (hereinafter, referred to as "first broadcast-independent application") to a broadcast-independent application acquired from another application server (e.g., application server 200B shown in FIG. 1) (hereinafter, referred to as "second broadcast-independent application") has failed due to a mismatch of the organization IDs thereof. Here, the application server 200B is a server belonging to a different organization (business operator) from the broadcast station (e.g., broadcast station 600 shown in FIG. 1). Therefore, the second broadcast-independent application provided from the application server 200B is not activated since its organization ID described in the XML-AIT differs from that of the first broadcast-independent application provided from the broadcast station 600 or the application server 200A.

[Activation Condition of Broadcast-Independent Application of This Embodiment]

For solving such a problem, in this embodiment, "common" can be set as identification information common to a plurality of or all business operators as a value of the organization ID in the XML-AIT. When "common" is set as the value of the organization ID in the acquired XML-AIT, the information processing apparatus 500 removes the broadcast-independent application as a control target of the XML-AIT from the target judged as unpermitted to be activated based on the organization ID.

Moreover, for suppressing a side effect in the security due to an alleviation of the limit on the activation based on the judgment by the organization ID, an XML signature is obligated to be attached to the XML-AIT in this embodiment. The information processing apparatus 500 validates the XML signature acquired with the XML-AIT, and only when the validity is validated, permits the activation of the application based on the XML-AIT.

[Structure of Information Processing Apparatus 500]

Figure 11:
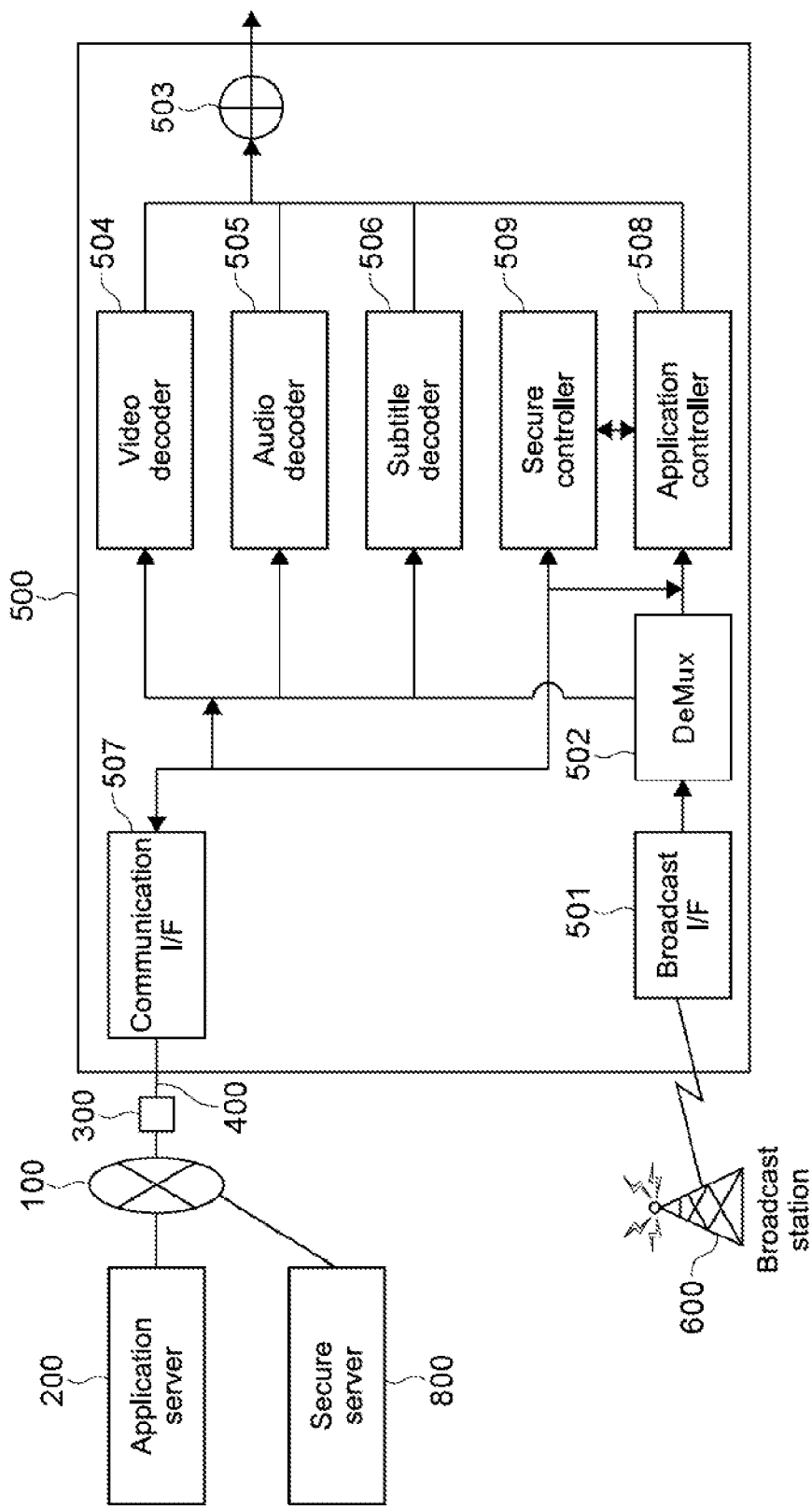
FIG. 11
A block diagram showing a functional structure of the information processing apparatus shown in FIG. 1.

FIG. 11 is a block diagram showing the structure of the information processing apparatus 500 of this embodiment.

The information processing apparatus 500 includes a broadcast interface 501, a demultiplexer 502, an output processing unit 503, a video decoder 504, an audio decoder 505, a subtitle decoder 506, a communication interface 507, an application controller 508, and a secure controller 509.

The broadcast interface 501 includes an antenna and a tuner and uses them to receive digital broadcast signals selected by the user. The broadcast interface 501 outputs a transport stream acquired by carrying out demodulation processing on the received digital broadcast signals to the demultiplexer 502.

The demultiplexer 502 separates a stream packet of a broadcast content, an application packet, and an AIT packet from the transport stream. The demultiplexer 502 separates a video ES (Elementary Stream), an audio ES, and a subtitle ES from the stream packet of the broadcast content. The demultiplexer 502 distributes the video ES to the video decoder 504, the audio ES to the audio decoder 505, the subtitle ES to the subtitle decoder 506, and the application packet and the AIT packet to the application controller 508.

The video decoder 504 decodes the video ES to generate a video signal and outputs the generated video signal to the output processing unit 503. The audio decoder 505 decodes the audio ES to generate an audio signal and outputs the generated audio signal to the output processing unit 503. The subtitle decoder 506 decodes the subtitle ES to generate a subtitle signal and outputs the generated subtitle signal to the output processing unit 503.

The communication interface 507 is an interface for establishing communication with an external apparatus via the second network 400 such as a LAN. The communication interface 507 may take either wireless communication or wired communication.

The application controller 508 is a controller that carries out processing related to control of applications.

The output processing unit 503 synthesizes the video signal from the video decoder 504, the audio signal from the audio decoder 505, the subtitle signal from the subtitle decoder 506, the video signal and audio signal from the application controller 508, and the like and outputs the resultant to the recording apparatus, display unit, and speaker unit (not shown) connected to the information processing apparatus 500.

The secure controller 509 validates an XML signature and notifies the application controller 508 of the validation result.

A part or all of the structure including at least the application controller 508 and the secure controller 509 of the information processing apparatus 500 can be provided by a computer including a CPU (Central Processing Unit) and a memory and a program.

Here, the XML signature will be described.

FIG. 12 is a diagram showing a data structure of the XML signature.

As shown in the figure, the XML signature includes an XML signature element, signature information (information indicating with respect to what the signature is to be made and what algorithm), an XML normalization algorithm, a signature algorithm, a normalization transformation process, a digest calculation algorithm, a digest value, a signature value, key information, a validation key, an X.509 certification, and an XML signature target element.

A format of the XML signature may be any of a detached signature independent from an XML-AIT, an enveloping signature in a format including an XML-AIT, and an enveloped signature in a format included in an XML-AIT. It should be noted that it is favorable to adopt the detached signature for suppressing an influence of the XML-AIT on the format.

The secure controller 509 validates the XML signature according to a procedure of a core validation including a reference validation and a signature validation.

The reference validation is a method of validating a reference (Reference) digest value (DigestValue) by applying a normalization transformation process (Transform) and a digest calculation algorithm (DigestMethod) to a resource (XML-AIT). The result obtained by the reference validation and the registered digest value (DigestValue) are compared, and when the values do not match, the validation ends in a failure.

The signature validation is a method of validating a signature using a method designated by the signature algorithm (SignatureMethod) by serializing the signature information (SignatureInfo) element by a normalization method designated by the XML normalization algorithm (CanonicalizationMethod) and acquiring key data using the key information (KeyInfo) and the like.

[Operation of Information Processing System 1 of this Embodiment]

Next, an operation of the information processing system 1 of this embodiment will be described.

FIG. 13 is a diagram showing a transition operation from a broadcast-independent application acquired from the application server 200A to a broadcast-independent application acquired from the application server 200B in the information processing apparatus 500 of the information processing system 1 shown in FIG. 1.

The information processing apparatus 500 receives a broadcast content (broadcast A) from the broadcast station 600 selected by the user using a remote controller, for example, carries out decode processing or the like on video data, audio data, subtitle data, and the like, and outputs the broadcast content (broadcast A) to the display unit and speaker unit connected to the information processing apparatus 500.

Specifically, the broadcast interface 501 receives digital broadcast signals of the broadcast content (broadcast A) from the broadcast station 600 selected by the user and outputs a transport stream obtained by carrying out demodulation processing and the like to the demultiplexer 502. The demultiplexer 502 separates a stream packet of the broadcast content from the transport stream and separates the stream packet of the broadcast content into a video ES, an audio ES, and a subtitle ES. The separated video ES, audio ES, and subtitle ES are decoded by the video decoder 504, the audio decoder 505, and the subtitle decoder 506, respectively, synthesized by the output processing unit 503, and output to the display unit and speaker unit.

In the operation example, at a time T1, a broadcast-related application and an AIT related to the broadcast-related application are superimposed on a broadcast content and broadcasted from the broadcast station 600. The organization ID described in the AIT is set as "0x01" allocated to the business operator of the broadcast station 600. The application control code is "AUTOSTART".

Figure 14:
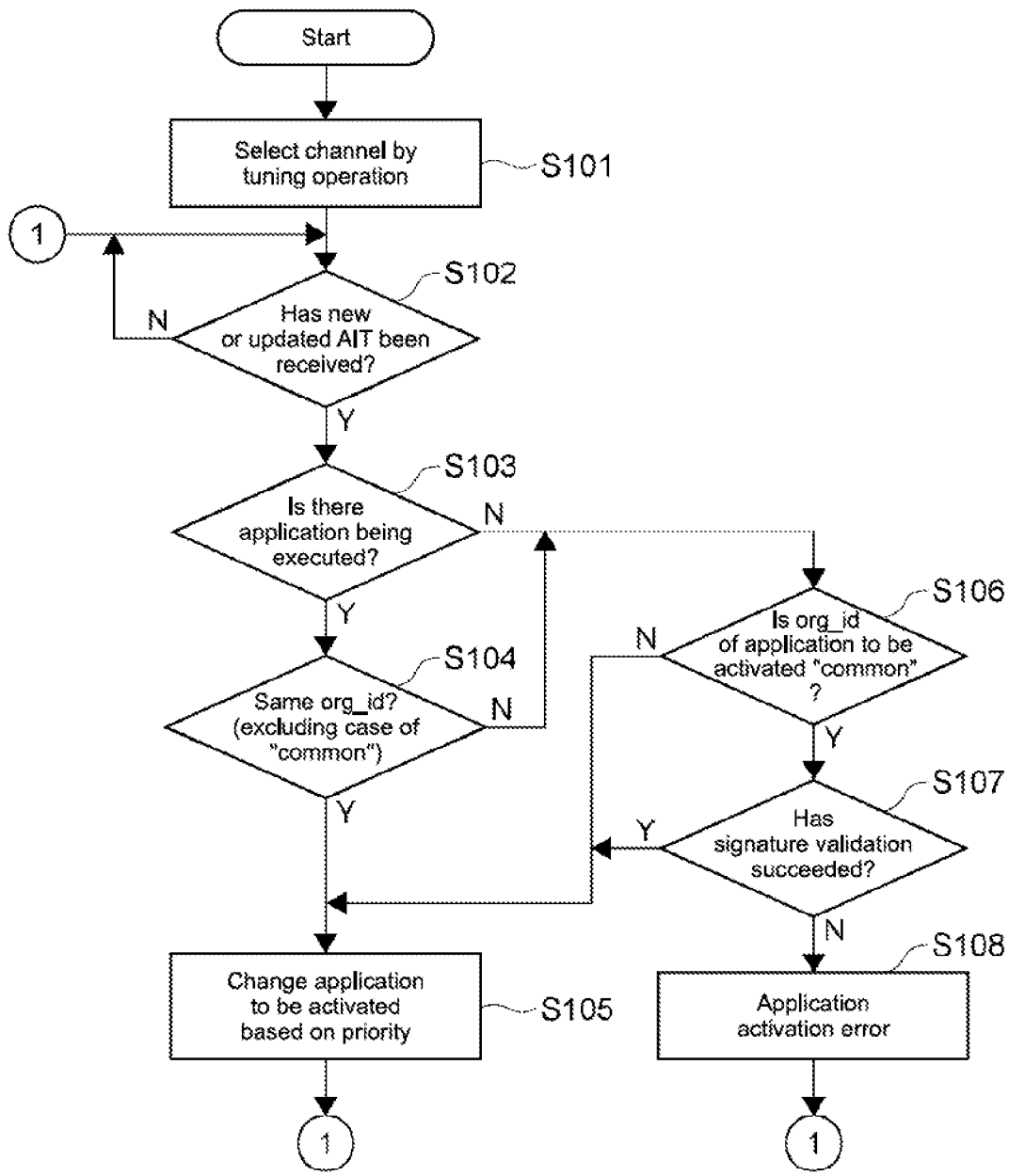
FIG. 14
A flowchart showing a processing procedure of the information processing apparatus shown in FIG. 1.

The demultiplexer 502 separates a packet of a first application and a packet of the AIT from the transport stream and supplies them to the application controller 508. Upon acquiring the broadcast-related application and the AIT, the application controller 508 executes the processing procedure shown in the flowchart of FIG. 14.

Specifically, upon acquiring the AIT (Step S102), the application controller 508 judges whether there is another application being executed (Step S103). Since there is no other application being executed at this point (NO in Step S103), the application controller 508 advances the processing to Step S105. In Step S105, processing of switching an execution to an application with a high priority is carried out, but since there is no other application being executed at this time, the application controller 508 activates the broadcast-related application based on the application control code "AUTOSTART" described in the acquired AIT.

In the operation example, a case where a script including a createApplication( ) function for activating a broadcast-independent application provided from the application server 200A is incorporated into the broadcast-related application is assumed. By executing the script as a predetermined condition on a time or the like is established while a broadcast-independent application is being executed, the application controller 508 acquires an XML-AIT for a broadcast-independent application from the application server 200A.

Upon acquiring the XML-AIT (Step S102), the application controller 508 judges whether there is another application being executed (Step S103). Since there is another broadcast-related application as the another application being executed at this point, the application controller 508 advances the processing to Step S104.

In Step S104, the application controller 508 judges whether the organization ID of the XML-AIT is the same as that of the AIT of the broadcast-related application already being executed (excluding case of "common").

When the organization IDs are the same (YES in Step S104), the application controller 508 advances the processing to Step S105 and activates one of the broadcast-related application being executed and the broadcast-independent application designated by the XML-AIT that has a higher priority (Step S105).

In the operation example shown in FIG. 13, the organization ID of the XML-AIT is "0x01", which is the same as the AIT. Therefore, the application controller 508 judges YES in Step S104 and advances the processing to Step S105. In the operation example, the broadcast-independent application has a higher priority. Accordingly, the broadcast-independent application is activated in place of the broadcast-related application.

Here, for activating the broadcast-independent application in place of the broadcast-related application, the application controller 508 first extracts information requisite for acquiring the broadcast-independent application from the XML-AIT, accesses the second application server 200A based on the information, and acquires the broadcast-independent application. Then, the application controller 508 ends the broadcast-related application and activates the broadcast-independent application based on the application control code "AUTOSTART" described in the XML-AIT. It should be noted that at this time, the broadcast-independent application is activated without validating the XML signature attached to the broadcast-independent application.

Next, a case where the user of the information processing apparatus 500 instructs to use a broadcast-independent application provided by the application server 200B not belonging to the organization of the broadcast station 600 at an arbitrary time T3 will be discussed. Hereinafter, a broadcast-independent application provided by the application server 200B will be referred to as "second broadcast-independent application", whereas a broadcast-independent application already being executed will be referred to as "first broadcast-independent application".

It should be noted that as a method of prompting the user to select the second broadcast-independent application belonging to a different organization from the first broadcast-independent application currently being executed, there is, for example, a method of causing, with a predetermined remote controller operation as a trigger, the information processing apparatus 500 to display a portal screen presenting the usable second broadcast-independent applications as icons or a list, and prompting the user to select the second broadcast-independent application to be activated from the portal screen. Information on a communication protocol requisite for acquiring an XML-AIT of the second broadcast-independent application, location information of a file, and the like are associated with the icons or list. As the icon or list corresponding to a desired second broadcast-independent application is selected by the user, the application controller 508 acquires, based on the information associated with the selected icon or list, an XML-AIT of the second broadcast-independent application from the application server 200B not belonging to the organization of the broadcast station 600 together with an attached XML signature.

Upon acquiring the XML-AIT (Step S102), the application controller 508 judges whether there is another application being executed (Step S103). Since the first broadcast-independent application is being executed at this point, the processing advances to Step S104.

In Step S104, the application controller 508 judges whether the organization ID of the XML-AIT for the second broadcast-independent application is the same as that of the XML-AIT for the first broadcast-independent application being executed (excluding case of "common").

When the organization IDs are the same as a result of the judgment (excluding case of "common") (YES in Step S104), the application controller 508 advances the processing to Step S105 and activates one of the first broadcast-independent application being executed and the second broadcast-independent application designated by the XML-AIT that has a higher priority (Step S105). Further, when the organization IDs are not the same (excluding case of "common") as a result of the judgment, the application controller 508 judges whether the organization ID of the newly-acquired XML-AIT for the second broadcast-independent application is "common" (Step S106). Here, although the application server 200B is a server of a business operator not belonging to the organization of the broadcast station 600, the organization ID is set as "common". Therefore, it is judged YES in Step S106, and the application controller 508 advances the processing to Step S107.

In Step S107, the application controller 508 requests the secure controller 509 to validate the XML signature attached to the XML-AIT for the second broadcast-independent application. Upon receiving a notification notifying that the validation of the XML signature has succeeded from the secure controller 509 (YES in Step S107), the application controller 508 compares the priority set in the XML-AIT for the second broadcast-independent application and the priority set in the XML-AIT for the first broadcast-independent application being executed, and activates the broadcast-independent application having a higher priority, for example. It should be noted that in the operation example, the priority of the second broadcast-independent application is higher. Accordingly, the second broadcast-independent application is activated in place of the first broadcast-independent application that has been executed.

For activating the second broadcast-independent application in place of the first broadcast-independent application, the application controller 508 first extracts information requisite for acquiring the second broadcast-independent application from the XML-AIT for the second broadcast-independent application, accesses the second application server 200B based on the information, and acquires the second broadcast-independent application. Then, the application controller 508 ends the first broadcast-independent application and activates the second broadcast-independent application based on the application control code "AUTOSTART" described in the XML-AIT for the second broadcast-independent application.

When the priorities of the applications are the same as a result of comparing the priorities, an application to be activated by a method set by the user in advance is determined, for example. For example, there are the following methods.

1. Continue an application currently being executed as it is and prohibit an activation of a new application.

2. Switch to a newly-acquired application.

3. Simultaneously set a plurality of applications having the same priority to an execution state. Continue an application currently being executed as it is and permit an activation of a new application.

Upon being notified of a failure in the validation of the XML signature, the application controller 508 does not permit the activation of the second broadcast-independent application (Step S108). Accordingly, it is possible to activate only a broadcast-independent application controlled by an XML-AIT to which an official XML signature is attached and secure system reliability.

As described above, according to this embodiment, the identification information "common" that is common to a plurality of or all business operators can be set as the organization ID for specifying a business operator providing an application. In addition, when the common identification information "common" is set as the organization ID in the acquired XML-AIT, the application controller 508 does not judge that an activation of an application corresponding to the XML-AIT is unpermitted based on the organization ID. Accordingly, it becomes possible to use an application seamlessly executable across channels of different broadcast stations, such as an application for a rating survey.

Moreover, in this embodiment, an XML signature is obligated to be attached to an XML-AIT in which identification information common to a plurality of business operators is set as the organization ID. Upon validating the XML signature and confirming its validity, the information processing apparatus 500 interprets the XML-AIT and permits an activation of a broadcast-independent application. Accordingly, reliability of the XML-AIT can be secured.

It should be noted that the present disclosure is not limited to the embodiment above, and various modifications can of course be made without departing from the gist of the present disclosure.

Although the embodiment presupposing the HbbTV standard has been described, the present disclosure is not necessarily limited to such a presupposition.

It should be noted that the present disclosure may also take the following structures.

(1)

An information processing apparatus, including:
a broadcast content processing unit that receives and processes a broadcast content; and
a controller that acquires an application related to the broadcast content and an application information table capable of setting identification information common to a plurality of business operators as a value of business operator identification information for specifying a business operator that provides the application, and removes, when the common identification information is set as the value of the business operator identification information in the application information table, the application from a target judged as unpermitted to be activated based on the business operator identification information.

(2)

The information processing apparatus according to (1) above, further including
a validation unit that acquires and validates an electronic signature obligated to be attached to the application information table and notifies the controller of the validation result,
in which the controller permits, when notified by the validation unit that the validation has succeeded, an activation of the application removed from the target judged as unpermitted to be activated based on the business operator identification information.

(3)

The information processing apparatus according to (1) or (2) above,
in which the controller acquires, from a server apparatus via a network, the application information table related to the application, and acquires the application based on information described in the application information table.

(4)

The information processing apparatus according to any one of (1) to (3) above,
in which the application is a broadcast-independent application that is independent from the broadcast content.

REFERENCE SIGNS LIST

100 first network
200, 200A, 200B application server
300 edge router
400 second network
500 information processing apparatus
501 broadcast interface
502 demultiplexer
503 output processing unit
504 video decoder
505 audio decoder
506 subtitle decoder
507 communication interface
508 application controller
509 secure controller
600 broadcast station

The invention claimed is:

1. An information processing apparatus, comprising:
a broadcast content processing unit that is configured to receive and process a broadcast content; and
a controller that is configured to acquire an application related to the broadcast content and an application information table capable of setting common identification information for a plurality of business operators, as a value of business operator identification information for specifying a business operator that provides the application, and remove, when the common identification information is set as the value of the business operator identification information in the application information table, the application from a target judged as unpermitted to be activated based on the business operator identification information.

2. The information processing apparatus according to claim 1, further comprising a validation unit that is configured to acquire and validate an electronic signature obligated to be attached to the application information table and notify the controller of the validation result,
wherein the controller is configured to permit, when notified by the validation unit that the validation has succeeded, an activation of the application removed from the target judged as unpermitted to be activated based on the business operator identification information.

3. The information processing apparatus according to claim 2,
wherein the controller is configured to acquire, from a server apparatus via a network, the application information table related to the application, and acquire the application based on information described in the application information table.

4. The information processing apparatus according to claim 3,
wherein the application is a broadcast-independent application that is independent from the broadcast content.

5. An information processing method, comprising:
receiving and processing a broadcast content;
acquiring, by a controller, an application related to the broadcast content and an application information table capable of setting common identification information, for a plurality of business operators, as a value of business operator identification information for specifying a business operator that provides the application; and
removing, by the controller, when the common identification information is set as the value of the business operator identification information in the application information table, the application from a target judged as unpermitted to be activated based on the business operator identification information.

6. A non-transitory computer-readable storage medium having stored thereon, a set of computer-executable instructions for causing a computer to execute steps comprising:

acquiring an application information table capable of setting common identification information for a plurality of business operators, as a value of business operator identification information for specifying a business operator that provides an application related to a broadcast content, and
removing, when the common identification information is set as the value of the business operator identification information in the application information table, the application from a target judged as unpermitted to be activated based on the business operator identification information.

7. The information processing apparatus according to claim 1, wherein the controller is configured to remove, when the common identification information is set as the value of the business operator identification information in the application information table, the application from the target judged as unpermitted to be activated based on the business operator identification information based on a predetermined priority.

* * * * *